E. H. REYNOLDS.
Vehicle Heater.
No. 65,010. Patented May 21, 1867.
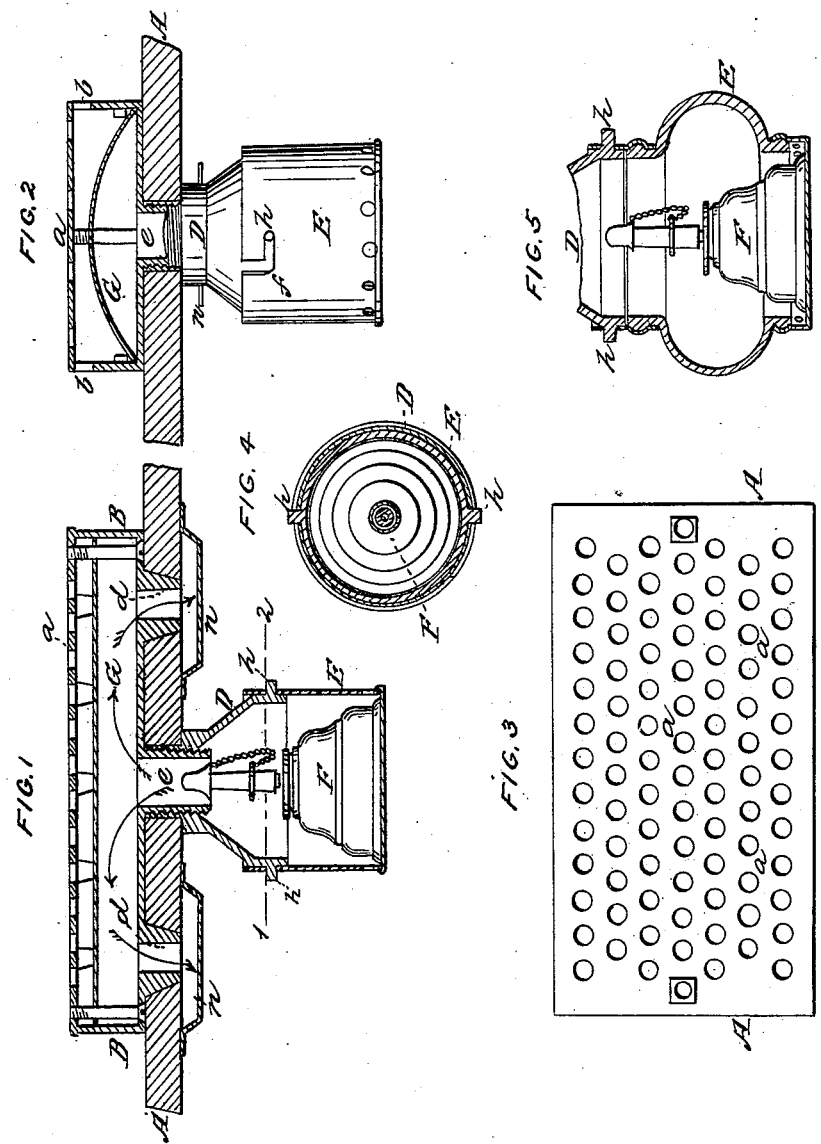

United States Patent Office.

EDWIN H. REYNOLDS, OF RISING SUN, MARYLAND.

Letters Patent No. 65,010, dated May 21, 1867.

LAMP-HEATER FOR VEHICLES.

*The Schedule referred to in these Letters Patent and making part of the same.*

TO ALL WHOM IT MAY CONCERN:

Be it known that I, EDWIN H. REYNOLDS, of Rising Sun, Cecil county, Maryland, have invented a Lamp-Heater for Vehicles; and I do hereby declare the following to be a full, clear, and exact description of the same, reference being had to the accompanying drawing, and to the letters of reference marked thereon.

My invention consists of a metal casing separated into an air-heating chamber, communicating with the interior of a vehicle, and a chamber into which the products of combustion from a lamp pass prior to escaping to the external air, without entering the vehicle, so that a warmth may be imparted to the interior of the latter without being accompanied with disagreeable vapors from the products of combustion. My invention further consists in combining with the said casing a glass lamp-holder, so that the driver can have the benefit of a light during dark nights.

In order to enable others to apply my invention, I will now proceed to describe its construction and operation, reference being had to the accompanying drawing, which forms a part of this specification, and in which—

Figure 1 is a vertical section of my improved lamp-heater for cars, carriages, &c.

Figure 2, a transverse vertical section.

Figure 3, a plan view.

Figure 4, a sectional plan on the line 1-2, fig. 1; and

Figure 5, a section of a modified form of casing for the lamp.

The red lines A represent the bottom of a car, or carriage, or other conveyance, and on this rests the oblong casing B of cast or plate iron, to the top of which is secured a perforated cover, $a$, and in the sides of which are any suitable number of openings, $b$. On the under side of the casing A are three tubular projections, $d, d$, and $e$, one of the former being situated near each end and the latter in the middle of the casing. These projections pass through the bottom A of the vehicle, and the central projection has screw-threads adapted to internal threads in the cover D of the lamp-case E, the latter having slots $f$, fig. 2, adapted to receive projections $h$ on the cover, so that the lamp-case can be readily detached and replaced from beneath the vehicle. The wick-tube of the lamp F projects a short distance into the central tubular projection $e$, the products of combustion passing upward, impinging against the partition G, and escaping through the tubular projections $d$ to the external air outside the vehicle. The casing A is separated by this partition G into the lower heating-chamber and upper hot-air chamber, the products of combustion imparting such a heat to this partition that air passing through the openings $b$ in the side of the casing becomes heated by contact with the partition before it escapes into the vehicle through the perforated cover $a$. As none of the products of combustion can gain access to the interior of the vehicle, the warmth imparted to the latter is not accompanied by disagreeable vapors from the lamp, in which may be burnt ordinary petroleum or other burning-fluid. In figs. 1 and 2 the lamp-case is shown as being made of metal, but when the lamp-heater has to be used in connection with ordinary carriages I make the case of glass, as seen in fig. 5, so that the driver may have the benefit of the light from the flame of the lamp during dark nights. In order to prevent currents of air from passing upwards and into the tubular projections $d$ $d$, shields $n$ $n$ may be secured to the bottom of the vehicle, so as to extend beneath the projections a short distance from the same.

Without confining myself to any particular form or construction of the casing B, or to any special number of outlets for the products of combustion, or to any particular style of lamp, I claim as my invention, and desire to secure by Letters Patent—

1. A casing, B, having a perforated top, $a$, side openings, $b$, partition G, and outlets $d$, in combination with a detached lamp, the whole being constructed and applied to the bottom A of a vehicle, substantially as and for the purpose described.

2. The combination of the above-mentioned casing B with a glass lamp-chamber.

3. The shields $n$ $n$ arranged beneath the tubular projections $d$ $d$, substantially as and for the purpose specified.

In testimony whereof I have signed my name to this specification in the presence of two subscribing witnesses.

E. H. REYNOLDS.

Witnesses:
 A. E. TODD,
 J. G. MATTHEWS.